(12) United States Patent
Nakamura et al.

(10) Patent No.: US 9,103,423 B2
(45) Date of Patent: Aug. 11, 2015

(54) LINEAR ACTUATOR

(71) Applicant: MINEBEA CO., LTD., Kitasaku-gun, Nagano (JP)

(72) Inventors: Manabu Nakamura, Fukuroi (JP); Masaaki Matsubara, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 257 days.

(21) Appl. No.: 13/727,035

(22) Filed: Dec. 26, 2012

(65) Prior Publication Data
US 2013/0213163 A1 Aug. 22, 2013

(30) Foreign Application Priority Data
Feb. 21, 2012 (JP) ................................ 2012-034678

(51) Int. Cl.
| | |
|---|---|
| F16H 25/22 | (2006.01) |
| H02K 7/06 | (2006.01) |
| H02K 37/14 | (2006.01) |
| H02K 7/08 | (2006.01) |
| F16H 25/20 | (2006.01) |

(52) U.S. Cl.
CPC ........ *F16H 25/2204* (2013.01); *F16H 25/2233* (2013.01); *H02K 7/06* (2013.01); *H02K 7/083* (2013.01); *H02K 37/14* (2013.01); *F16H 2025/2078* (2013.01); *Y10T 74/18664* (2015.01); *Y10T 74/19786* (2015.01)

(58) Field of Classification Search
CPC ............ F16H 25/2204; F16H 25/2223; F16H 2025/2078; H02K 7/06; H02K 7/083
USPC ......... 74/424.89, 424.9, 89.34; 403/265, 268, 403/269; 310/83
See application file for complete search history.

(56) References Cited

U.S. PATENT DOCUMENTS

| | | | | |
|---|---|---|---|---|
| 4,213,480 | A | * | 7/1980 | Orum et al. .................... 137/556 |
| 5,241,874 | A | * | 9/1993 | Matsuhama ................. 74/424.9 |
| 6,116,109 | A | * | 9/2000 | Zernickel ..................... 74/424.9 |
| 6,186,015 | B1 | * | 2/2001 | Regueiro ..................... 74/424.9 |
| 6,854,918 | B2 | * | 2/2005 | Ueno et al. .................... 403/265 |
| 7,690,624 | B2 | * | 4/2010 | Ito et al. ................... 251/129.12 |
| 2005/0275297 | A1 | | 12/2005 | Suzuki et al. |
| 2008/0129133 | A1 | * | 6/2008 | Taube et al. ..................... 310/80 |
| 2010/0301838 | A1 | * | 12/2010 | Hors et al. ..................... 324/155 |

FOREIGN PATENT DOCUMENTS

JP   2005-354858 A   12/2005

\* cited by examiner

*Primary Examiner* — William Kelleher
*Assistant Examiner* — Thomas Magnuson
(74) *Attorney, Agent, or Firm* — Carrier Blackman & Associates, P.C.; Joseph P. Carrier; William D. Blackman (57) ABSTRACT

There is provided a linear actuator including an output shaft formed with a helical groove, a retainer having a cylindrical shape to receive the output shaft therein, and provided with a plurality of concave portions in dotted manner at positions of an inner peripheral surface thereof along the helical groove, and a rotor magnet fixed to the retainer. Balls are retained in the plurality of concave portions, respectively, and when the retainer is rotated, the balls are moved along the helical groove of the output shaft in a state where the balls are retained in the concave portions.

5 Claims, 10 Drawing Sheets

LINEAR ACTUATOR

BACKGROUND OF THE INVENTION

1. Field of the Invention

The present invention relates to a linear actuator.

2. Description of the Related Art

There is known a linear actuator for converting rotary movement of a rotor to linear movement of an output shaft to output it (e.g., see JP-A-2005-354858).

The related-art linear actuator includes an output shaft provided with a male threaded portion, and a receiving side provided with a female threaded portion. The male threaded portion is engaged with the female threaded portion to convert the rotary movement to the linear movement in an axial direction. Since the threaded portions structure causes large frictional resistance, so that the efficiency of the structure is poor, the torque of the motor is not effectively transmitted to an output shaft.

A linear motion system of a ball-screw structure is conceivable as a structure for coping with the above problem. In this structure, a ball screw is formed on a shaft, and a ball groove is also formed at a portion corresponding to a nut portion, so that a ball is retained in the ball groove. As a result, the shaft can take a linear movement even by small torque. However, since the helical ball groove has to be formed inside the rotor with high precision, the structure requires high machining cost, so that its price becomes higher.

SUMMARY OF THE INVENTION

Accordingly, the present invention has been made in view of the above circumstances, and it is an object of the present invention to provide a linear actuator having a ball-screw structure without forming a ball groove on an inner diameter side of a rotor.

According to an illustrative embodiment of the present invention, there is provided a linear actuator comprising: an output shaft formed with a helical groove; a retainer having a cylindrical shape to receive the output shaft therein, and provided with a plurality of concave portions in dotted manner at positions of an inner peripheral surface thereof along the helical groove; and a rotor magnet fixed to the retainer. Balls are retained in the plurality of concave portions, respectively, and when the retainer is rotated, the balls are moved along the helical groove of the output shaft in a state where the balls are retained in the concave portions.

According to the above configuration, since the balls are retained in the plurality of concave portions provided in a dotted manner, the linear actuator having the ball-screw structure is obtained without forming the ball groove on the inner diameter side of the rotor.

In the above linear actuator, the retainer may have a structure dividable into a plurality of pieces. According to the configuration, since the balls can be retained in the concave portions inside the retainer in the state where the retainer is disassembled, the workability in the process of putting the balls in the retainer is improved.

The above linear actuator may further comprise a pair of sleeves having a cylindrical shape and mounted on a circumference of the retainer from a front side and a rear side in an axial direction. The pair of sleeves may have edge portions opposing each other, and each of the edge portions is provided with a concave-convex structure, and the circumference of the retainer may be provided with a protrusion inserted in the concavo-convex structures. According to this configuration, the position relation between the retainer and the sleeve can be determined with good precision.

In the above linear actuator, the concave-convex structures provided on the edge portions of the pair of sleeves may be fixed to the retainer with an adhesive in a state where a concave portion of one of the sleeves oppose a concave portion of the other of the sleeves, and a convex portion of one of the sleeves oppose a convex portion of the other of the sleeves. A gap formed between an opposing section of the concave portions may be configured as an adhesive space filled with the adhesive. According to this configuration, since the adhesive space is formed, the retainer and the sleeve can be further firmly fixed.

In the above linear actuator, the retainer may include a first retainer segment, a second retainer segment, and a third retainer segment divided in a circumferential direction. The first retainer segment and the second retainer segment may have a same shape. The third retainer segment may be provided with the protrusion contacting the concavo-convex structure of each of the sleeves, so that the protrusion is configured to position the concavo-convex structures of the pair of sleeves relative to each other and configured to prevent rotation of the pair of sleeves.

According to the above configuration, since components configuring the retainer segments are common (have same shape), increase in cost is suppressed. The structure capable of positioning the pair of sleeves and also preventing rotation can be obtained by use of the protrusion of the third retainer segment.

According to the above configuration, there is provided a linear actuator having a ball-screw structure without forming a ball groove on an inner diameter side of a rotor.

DETAILED DESCRIPTION

First Illustrative Embodiment
(Structure)

Figure 1:
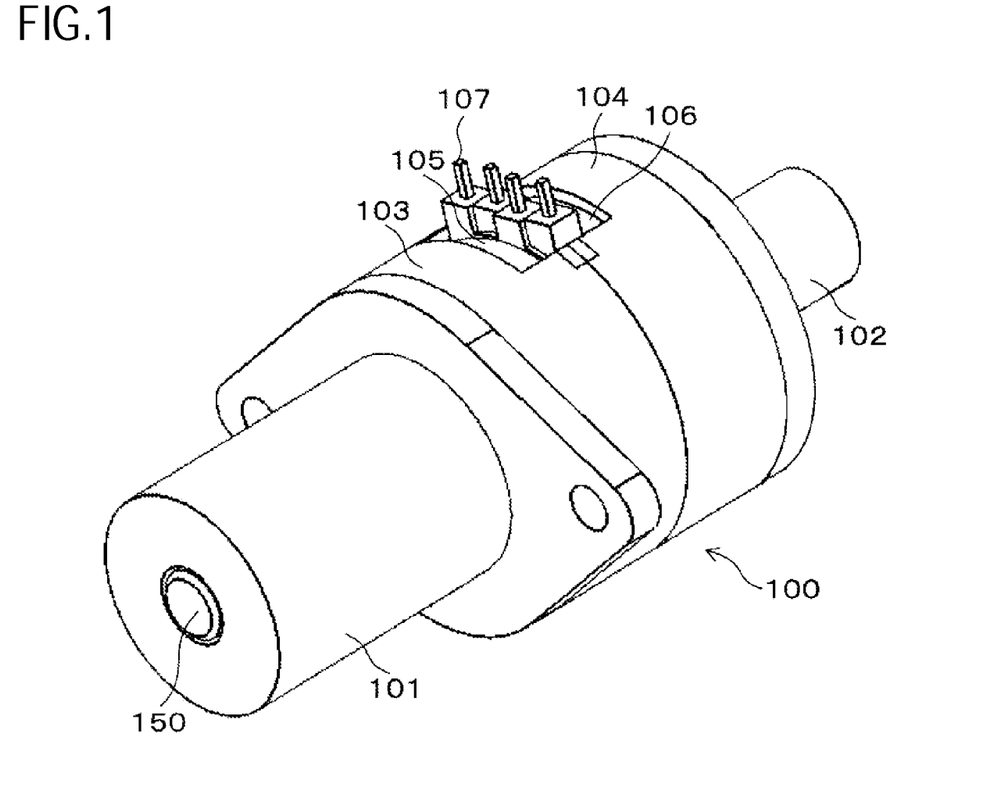
FIG. 1 is a perspective view of a linear actuator according to an illustrative embodiment.
Figure 2A:
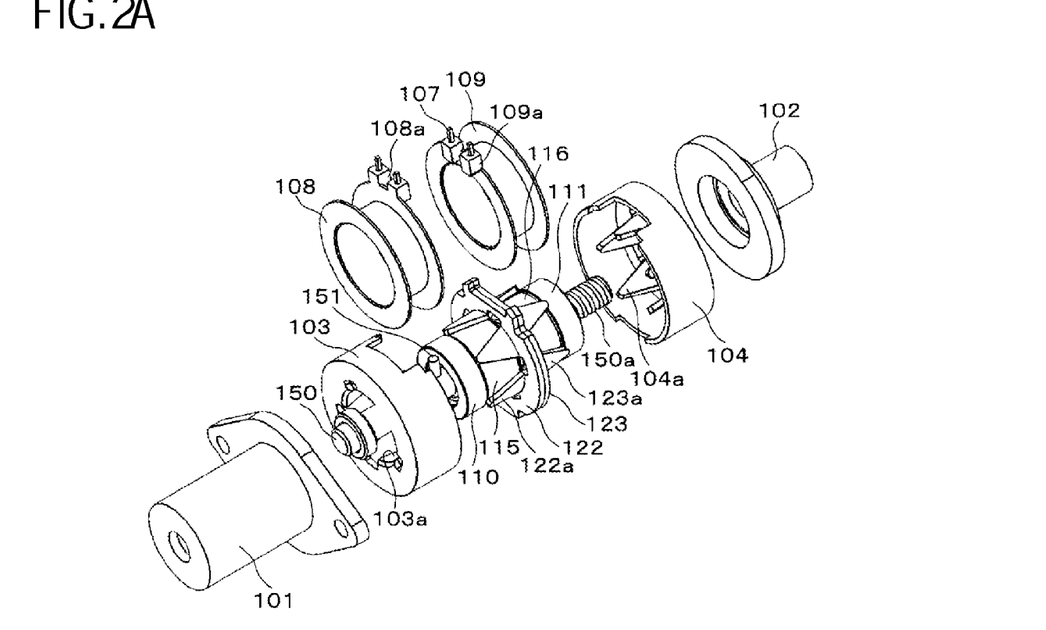
FIGS. 2A and 2B are exploded perspective views of the linear actuator according to the illustrative embodiment.
Figure 2B:
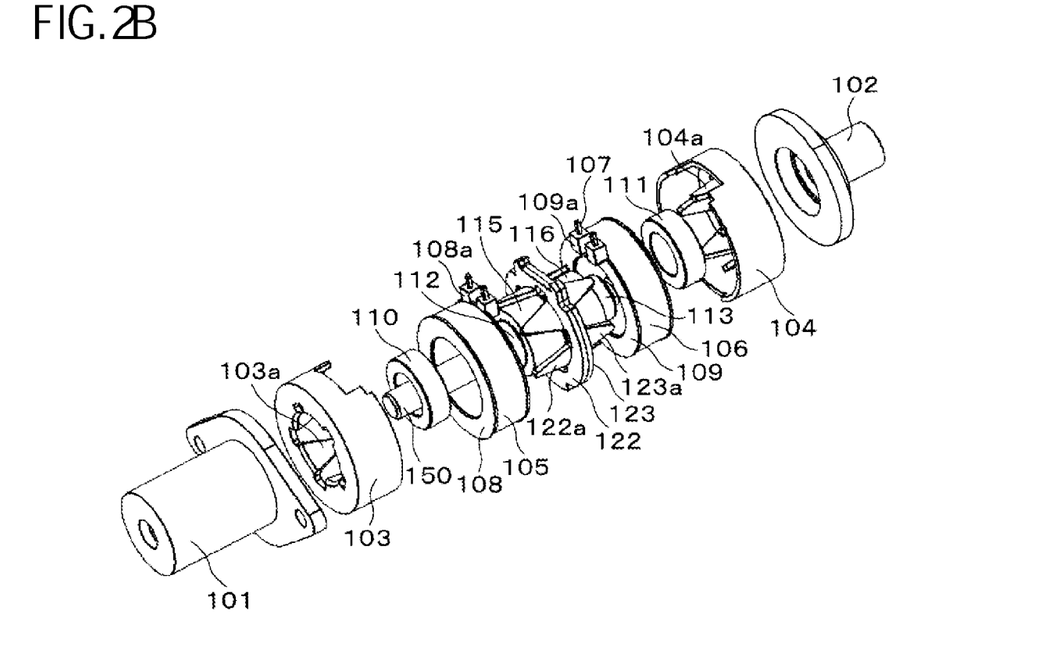
Figure 3:
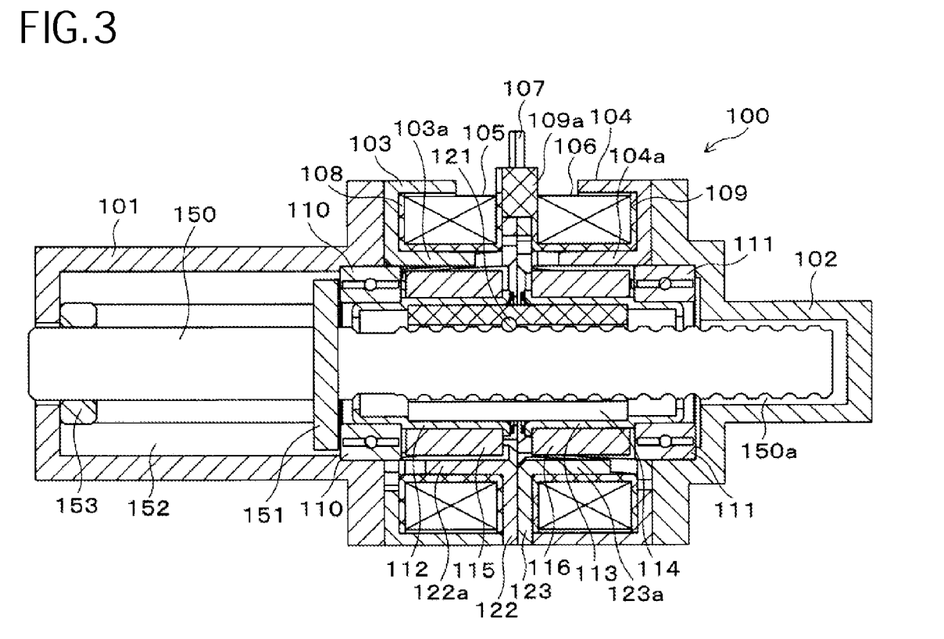
FIG. 3 is a sectional side view of the linear actuator according to the illustrative embodiment.

FIG. 1 shows a linear actuator 1 according to a first illustrative embodiment. FIGS. 2A and 2B show a state where the linear actuator 100 is disassembled. FIG. 3 shows a sectional side view of the linear actuator 100 in FIG. 1 taken along an axial direction. The linear actuator 100 illustrated in FIGS. 1 to 3 includes a front housing 101, an end housing 102, a stator 103, a stator 104, and an output shaft 150. The output shaft 150 is formed with a helical groove 150a configuring a ball screw. The output shaft 150 is driven by a mechanism which will be described later, and is moved in the axial direction with respect to the front housing 101. The output shaft 150 is moved in the axial direction, thereby achieving the operation of the linear actuator. As shown in FIG. 1, four terminal pins 107 are connected to driving coils 105 and 106, specifically, ends of coils configuring the driving coils 105 and 106. The terminal pins 107 are connected with a wiring for supplying a driving current from an external device.

The stators 103 and 104 configure a stator of a claw-pole type stepping motor. The stators 103 and 104 are made of a magnetic material (e.g., electromagnetic soft iron or rolled steel plate), and have a cylindrical shape having pole teeth 103a and 104a extending in the axial direction. The stator 103 is assembled with an inner stator 122 having teeth 122a engaged with the teeth 103a in a state where a gap is formed therebetween. A bobbin 108 made of resin with the driving coil wound is put in a space between the stator 104 and the inner stator 122. In this instance, in FIG. 2A, the coils 105 and 106 are not illustrated.

The bobbins 108 and 109 have terminal base portions 108a and 109a for vertically arranging the terminal pins 107. The stator 103 is engaged with the front housing 101, and the stator 104 is engaged with the end housing 102. The stators 103 and 104 are engaged with each other in the axial direction in the state where the inner stators 122 and 123 are put therein.

A bearing 110 is attached at an inside (axially center side) of the front housing 101 and the stator 103, and a bearing 111 is attached at an inside of the end housing 102 and the stator 104. The bearing 110 retains a cylindrical sleeve 112 in a rotatable state, and the bearing 111 retains a cylindrical sleeve 113 in a rotatable state. A retainer 114 is held inside the sleeves 112 and 113. Also, magnets 115 and 116 made of permanent magnet are fixed to the outside of the sleeves 112 and 113. The sleeves 112 and 113 are made of magnetic material, and function as a back yoke of the rotor magnets 115 and 116. Furthermore, the outside of the rotor magnet 115 opposes the pole teeth 103a and 122a in the state where a gap is formed therebetween, and the outside of the rotor magnet 116 opposes the pole teeth 104a and 123a in a state where a gap is formed therebetween.

Figure 7A:
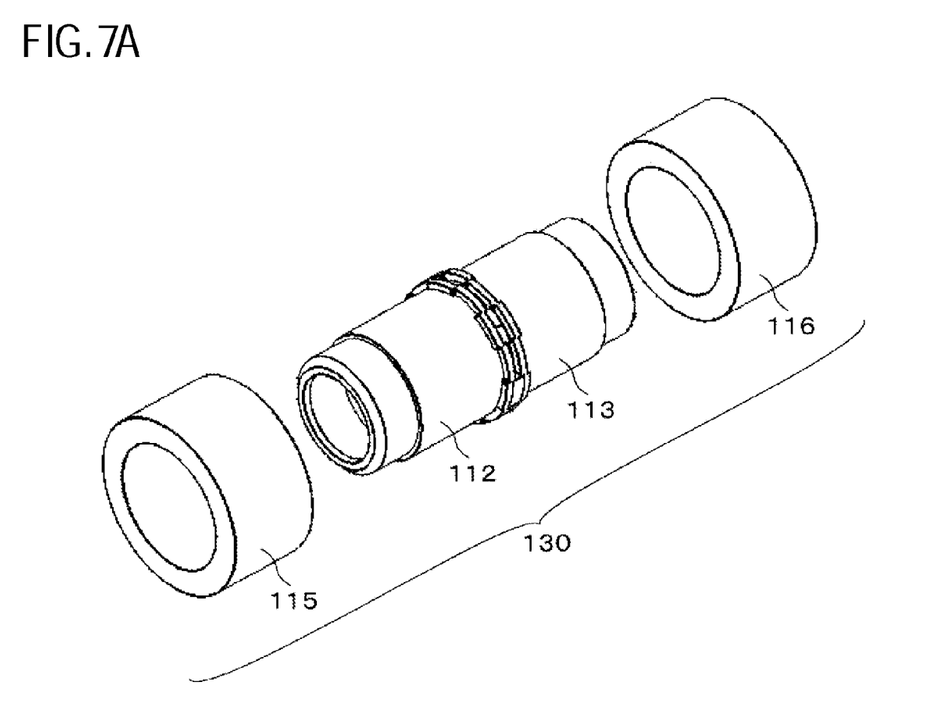
FIGS. 7A and 7B are exploded perspective views of a rotor.
Figure 7B:
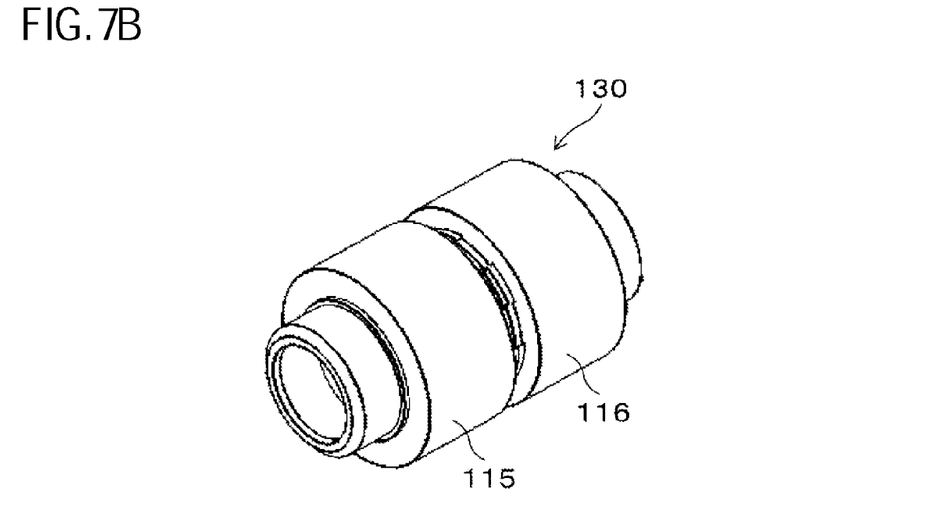

A rotor, which will be described later, illustrated in FIG. 7 is configured by the sleeves 112 and 113, the retainer 114, and the rotor magnets 115 and 116. The rotor 130 is rotatably held in the stators 103 and 104 by the bearings 110 and 111.

Figure 4:
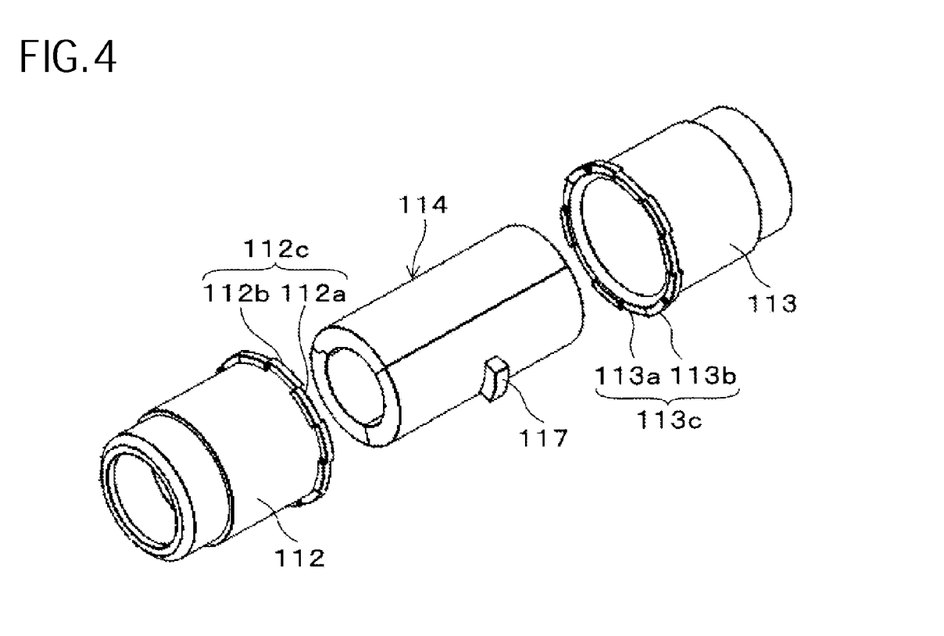
FIG. 4 is a perspective view illustrating a state where sleeves are separated from a retainer.
Figure 5A:
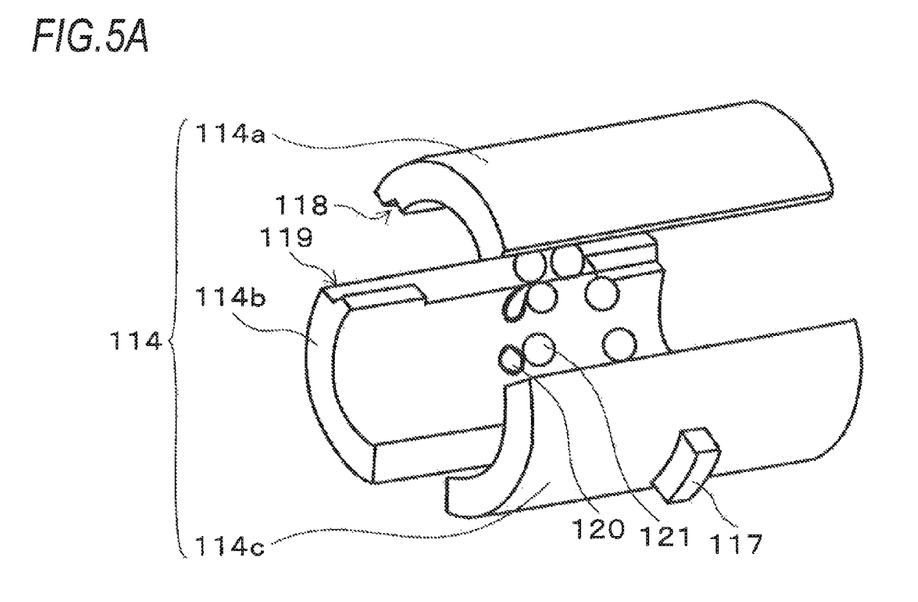
FIGS. 5A and 5B are perspective views illustrating a disassembled state of the retainer.
Figure 5B:
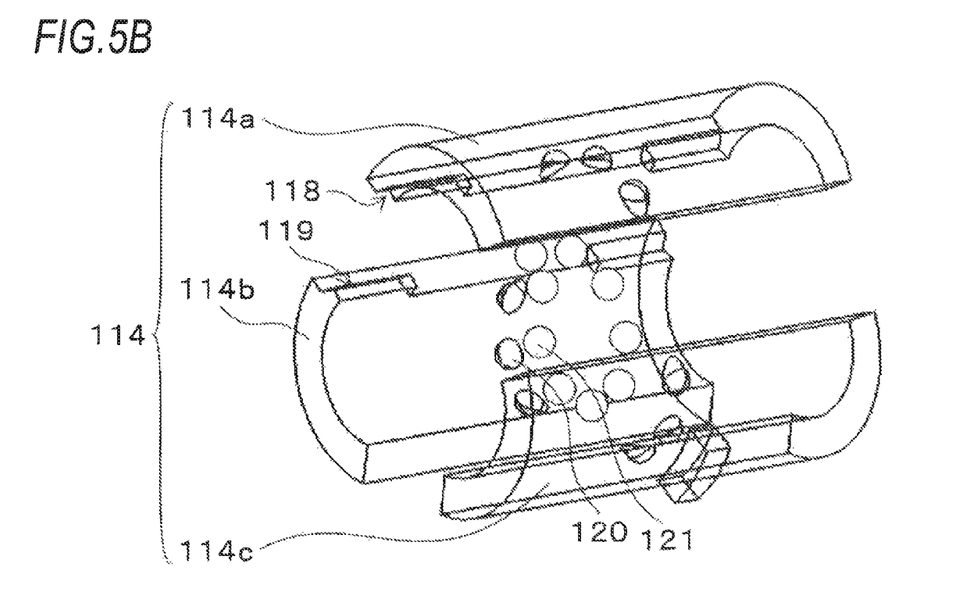
Figure 6A:
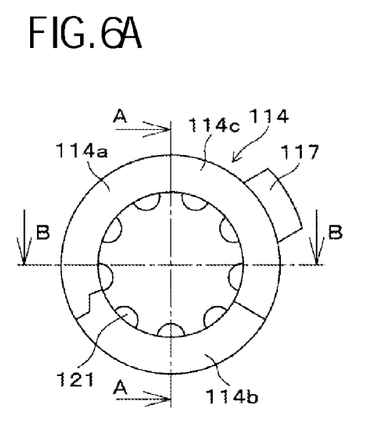
FIG. 6A is a front view of the retainer when seen from an axial direction.
Figure 6B:
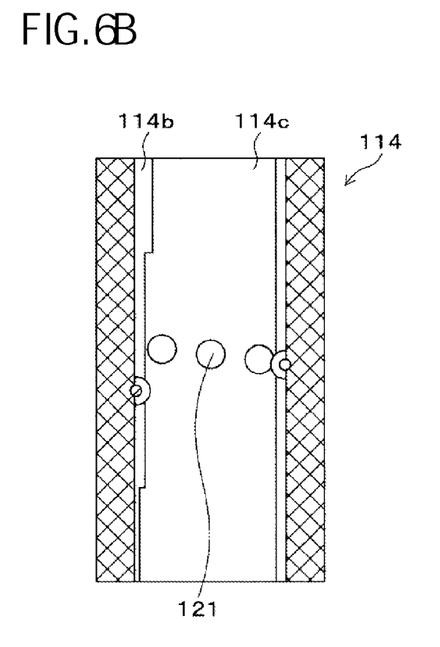
FIG. 6B is a sectional side view taken along the line A-A in FIG. 6A.
Figure 6C:
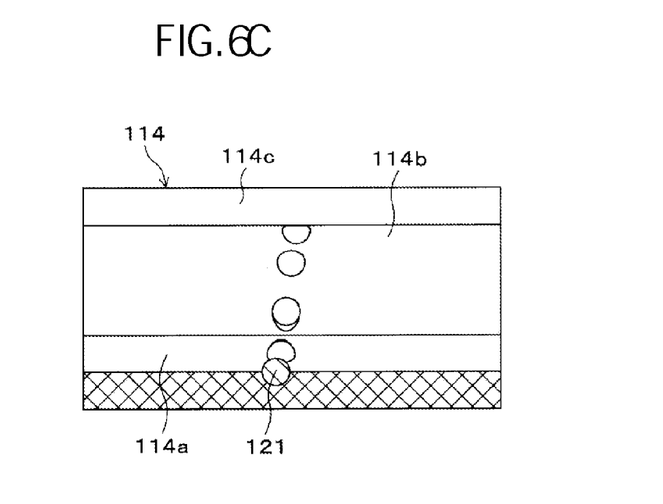
FIG. 6C is a sectional top view taken along the line B-B in FIG. 6A.

FIG. 4 is a perspective view illustrating a state where the sleeves 112 and 113 are separated from the retainer 114. FIGS. 5A and 5B are perspective views illustrating a disassembled state of the retainer 114. FIG. 6A is a front view of the retainer 114 when seen from the axial direction, FIG. 6B is a sectional side view taken along the line A-A in FIG. 6A, and FIG. 6C is a sectional top view taken along the line B-B in FIG. 6A.

The retainer 114 has a cylindrical shape formed by combining retainer segments 114a, 114b and 114c divided in three pieces in a circumferential direction, or more specifically along lines extending parallel to an axis of the retainer as shown. The retainer segments 114a and 114b are members having the same shape, and have shapes indicated by reference numeral 118 and 119. The sleeves 112 and 113 and the retainer 114 are integrated by cylindrical sleeves 112 and 113 from the axial front and rear sides of the retainer 114 (FIG. 4).

As illustrated in FIG. 4, an edge portion of the end of the sleeve 112, opposing the sleeve 113, is provided with a concavo-convex structure 112c having concave portions 112a and convex portions 112b. Further, an edge portion of the end of the sleeve 113, opposing the sleeve 112, is provided with a concavo-convex structure 113c having concave portions 113a and convex portions 113b. The concavo-convex structures 112c and 113c are assembled with each other such that the concave portions 112a and concave portions 113a oppose each other in the axial direction and that the convex portions 112b and the convex portions 113b oppose each other in the axial direction.

The retainer 114c is provided on its circumference with a positioning member 117 which is a protrusion. In the assembled state, the positioning member 117 is inserted in the gap formed between the concave portion 112a and the concave portion 113a opposing each other such that the positioning member 117 is interposed between the concavo-convex structures 112c and 113c. The positioning member 117 determines a positional relation of the sleeve 112 and the sleeve 113 in an axial rotation direction, and a positional relation of the sleeves 112 and 113, and the retainer 114. Further, a rotation preventing structure where the sleeves 112 and 113 are not rotated with respect to the retainer 114 is obtained by the positioning member 117. Although the gap formed between the opposing portions of the concave portion 112a and the concave portion 113a is provided in plural, the positioning member 117 is engaged with one of the gaps, and the other gaps are configured (function) as an adhesive space of an adhesive for fixing the sleeves 112 and 113, and the retainer 114.

An inner peripheral surface of the retainer 114 is provided with a plurality of concave portions 120 having an approximately hemispherical shape at positions along a helical direction. The concave portions 120 are provided in a dotted manner with an interval therebetween along the helical direction in which the helical groove 150a formed on the output shaft 150 extends. Each of the concave portions 120 retains a ball 121 while contacting the concave portion 120. The balls 121 are not stationary fixed in the concave portions 120, but are retained while being in contact with the concave portions via grease. The balls 121 are retained in a state where the balls are in contact with concave surfaces of the concave portions 120 and are restricted inside the concave portions 120. In this illustrative embodiment, the plurality of concave portions 120 are provided in series on a circumference corresponding to one rotation of a helix. The shape of the helix, along which the plurality of concave portions are formed, corresponds to a pitch of the helical groove 150a formed on the output shaft 150 (see FIGS. 2 and 3). The respective balls 121 retained in the plurality of concave portions 120 comes in contact with each other in a state where it rolls in the helical groove 150a of the output shaft 150.

In this illustrative embodiment, the inner peripheral surface of the concave portion 120 has the concave surface of the hemispherical shape for receiving the ball 121 therein. As long as the shape of the inner peripheral surface of the concave portion 120 is a concave curved surface capable of receiving the ball 120 therein, it is not limited to the hemispherical shape.

FIG. 7A is an exploded perspective view of the rotor 130, and FIG. 7B is a perspective view thereof. In the state illustrated in FIG. 7A, the retainer 114 is held in the sleeves 112 and 113 (see FIG. 4). The rotor magnet 115 of the cylindrical shape is attached to the outside of the sleeve 112, and the rotor magnet 116 of the cylindrical shape is attached to the outside of the sleeve 113. The rotor magnets 115 and 116 have a magnetic pole structure magnetized in an NSNS manner along a circumferential direction.

Figure 8:
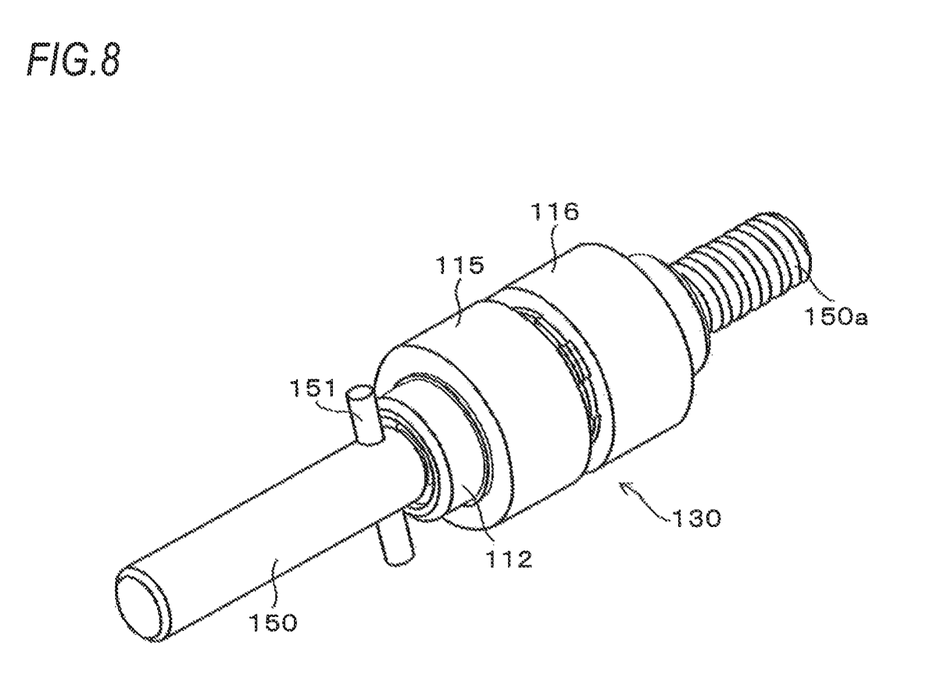
FIG. 8 is a perspective view illustrating a state where an output shaft is installed inside the rotor.

FIG. 8 shows the state where the output shaft 150 is assembled in the rotor 130. In this instance, the inside of the rotor 130 (the inside of the retainer 114) is indirectly engaged with the outside of the output shaft 150, with the balls 121 interposed therebetween. That is, the inside of the retainer 114 is provided with the plurality of concave portions 120 (see FIG. 5), and the plurality of concave portions 120 retain the ball 121 in a state where the respective concave portions comes in contact with the ball 121. In addition, the balls 121 come in contact with the concave portions in the state where the balls 121 can roll in the helical groove 150a (see FIG. 3).

In the state illustrated in FIG. 8, if the output shaft 150 is fixed and the retainer 114 is set to be rotatable around the output shaft 150, the balls 121 roll along the helical direction in the helical groove 150a in the state where the balls 121 are retained in the concave portions 120. And, the retainer 114 is axially moved while rotating with respect to the output shaft 150. In contrast, if the output shaft 150 is set not to be rotatable and the retainer 114 is set not to be axially moved but is rotatable, when the retainer 114 is rotated around the shaft, the balls 121 roll in the helical groove 150a, and thus the output shaft 150 is axially moved with respect to the retainer 114. That is, the rotation movement of the retainer 114 is converted into the linear movement of the output shaft 150.

The output shaft 150 is provided with a pin 151 extending in a direction (up and down in the drawing) perpendicular to its axial direction. The pin 151 functions as a rotation preventing member for preventing the output shaft 150 from being rotated around the shaft with respect to the front housing 101 (stators 103 and 104). The pin 151 is accommodated in a pin accommodating chamber 152 provided in the front housing 101, such that the pin is axially movable therein. The pin accommodating chamber 152 is a space extending in the axial direction. If the output shaft 150 is about to rotate, the pin 151 comes in contact with a side wall of the pin accommodating chamber 152, thereby restricting the rotation of the output shaft 150. On the other hand, the pin 151 is movable in the axial direction in the state where the pin is accommodated in the pin accommodating chamber 152, so that the output shaft 150 is allowed to move in the axial direction of the output shaft 150 with respect to the front housing 101.

In addition, as illustrated in FIG. 3, the output shaft 150 is held in the front housing 101 in the state where the output shaft is axially movable by the bearing 153.

(Assembly Process)

One example of a process for assembling the structure illustrated in FIG. 8 will now be described. First, as illustrated in FIG. 5, the ball 121 is retained in the respective concave portions 120 in the state where the retainer 114 is divided into the retainer segment pieces 114a, 114b and 114c. In this instance, the grease is applied to the balls 121, the balls 121 are retained in the concave portions 120 by the viscosity of the grease. Next, as illustrated in FIG. 5, as the retainer segment pieces 114a, 114b and 114c are assembled, the retainer 114 illustrated in FIG. 4 is obtained, and are covered by the sleeves 112 and 113 from the front side and the rear side along the axial direction. The retainer 114 and the sleeves 112 and 113 are fixed to each other by an adhesive.

Although the plurality of gaps are formed between the opposing portions of the concave portions 112a and the concave portions 113a, the positioning member 117 is inserted in one of the gaps, and the other gaps function as the adhesive space filled with the adhesive.

Next, as illustrated in FIG. 7A, the rotor magnet 115 is attached to the outside of the sleeve 112, and the rotor magnet 116 is attached to the outside of the sleeve 113, thereby obtaining the state illustrated in FIG. 7B. Also, fixation of the rotor magnet 115 to the sleeve 112 and fixation of the rotor magnet 116 to the sleeve 113 are performed by use of the adhesive.

If the state of FIG. 7B is obtained, the output shaft 150 is inserted into the retainer 114 (FIG. 7B shows that it is concealed in the sleeves 112 and 113) positioned in the inside, and the balls 121 (see FIG. 5) retained in the concave portions 120 (see FIG. 5) are engaged with the helical groove 150a of the output shaft 150. As the output shaft 150 is rotated in the state where the engagement is maintained, the output shaft 150 is axially moved while rotated, thereby obtaining the state illustrated in FIG. 8, that is, the output shaft 150 is assembled in the stator 130.

(Example of Operation)

The driving current with its polarity alternatively changed is applied to the driving coils 105 and 106 via the terminal pin 107. Due to the principle of a claw-pole shaped stepping motor, a repulsive force and an attractive force act between the driving coils 105 and 106 and the rotor magnets 115 and 116 in the circumferential direction, and are alternatively changed, so that the rotor illustrated in FIGS. 7 and 8 is rotated. In this instance, the balls 121 are restrained by the concave portions 120 and the helical groove 150a of the output shaft 150. Since the output shaft 150 is not rotated by the function of the pin 151, the output shaft 150 is axially moved by the principle of the screw. The moving direction of the output shaft 150 is reversed by reversing the rotation direction of the retainer 114. In this way, the linear movement of the output shaft 150 is performed by rotating the retainer 114.

(Advantages)

Since the balls 121 are retained by the concave portion 120 of the hemispherical shape, the linear actuator with the ball-screw structure is obtained without forming the ball groove on the inner diameter side of the rotor 130. In addition, since the position of the balls 121 relative to the rotor 130 is determined by the concave portion 120, the relative position relation of the balls 121 helically arranged in series becomes stable, so that the rotation of the rotor 130 and the linear movement of the output shaft 150 due to the rotation of the rotor 130 are smoothly performed. Also, if the gaps formed between the opposing sections of the concave portions 112a and the concave portions 113a function as the adhesive space, the firmly attached state is obtained, and the rotation preventing structure for the sleeves 112 and 113 is also obtained.

Second Illustrative Embodiment

Figure 9A:
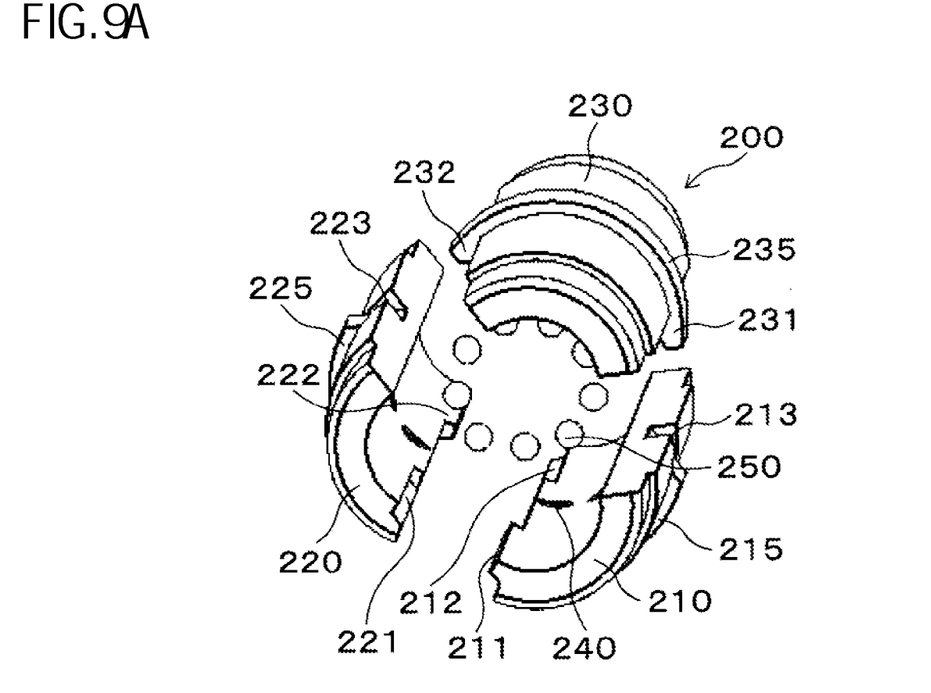
FIGS. 9A and 9B are exploded perspective views of the retainer according to a second illustrative embodiment of the present invention.
Figure 9B:
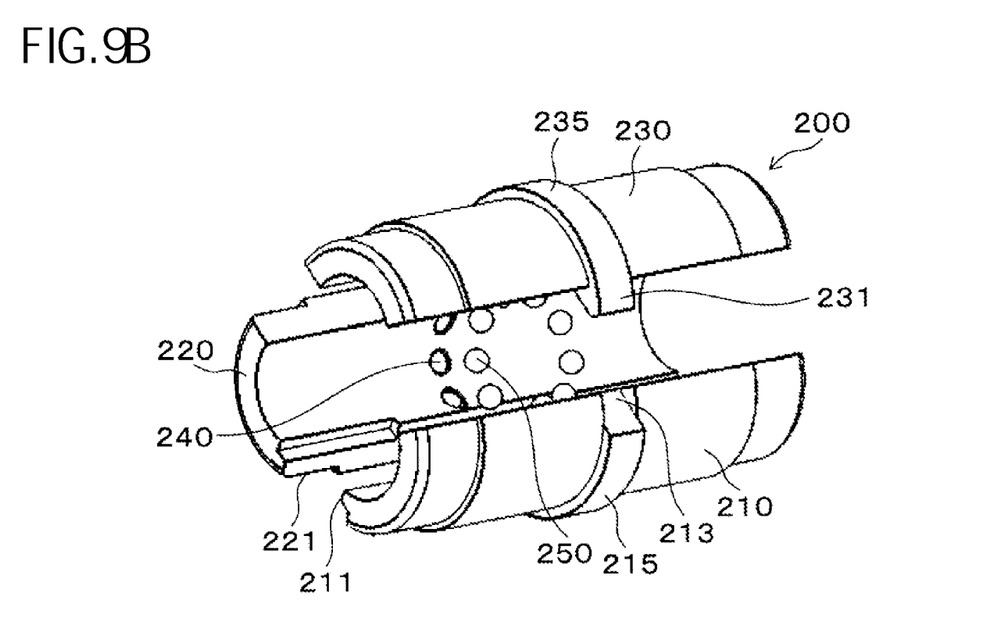

The first illustrative embodiment employs the structure where the cylindrical sleeve is mounted on the outside of the retainer to form the retainer of the segmented structure in the integral body, but the structure without sleeve can be also employed. Now, one example of the structure without sleeve will be described. FIGS. 9A and 9B show exploded perspective views of a retainer 200. The retainer 200 has a structure of assembling retainer segment pieces 210, 220 and 230 divided into three pieces in a circumferential direction.

The retainer segment piece 210 has a convex portion 211 and a concave portion 212, and the retainer segment piece 220 has a concave portion 221 and a convex portion 222. As the convex portion 211 and the concave portion 221 are engaged with each other, and the concave portion 212 and the convex portion 222 are engaged with each other, the retainer segment pieces 210 and 220 are assembled. The retainer segment piece 230 has a magnet stopper 235 having a convex cross section and extending in the circumferential direction. Convex portions 231 and 232 protruding in the circumferential direction are formed by use of a portion of the magnet stopper 235. The convex portion 231 is engaged with the concave portion 213 of the retainer segment piece 210, while the convex portion 232 is engaged with the concave portion 223 of the retainer segmented piece 220.

Also, the retainer segment piece 230 is provided with a magnet stopper 215 having a convex cross section and extending in the circumferential direction. In addition, the retainer segment piece 220 is provided with a magnet stopper 225 having a convex cross section and extending in the circumferential direction. The inside of the respective retainer segment pieces 210, 220 and 230 are provided with a plurality of concave portions 240 which are the same as the retainer 114, and a ball 250 is retained in each of the plurality of concave portions.

Figure 10A:
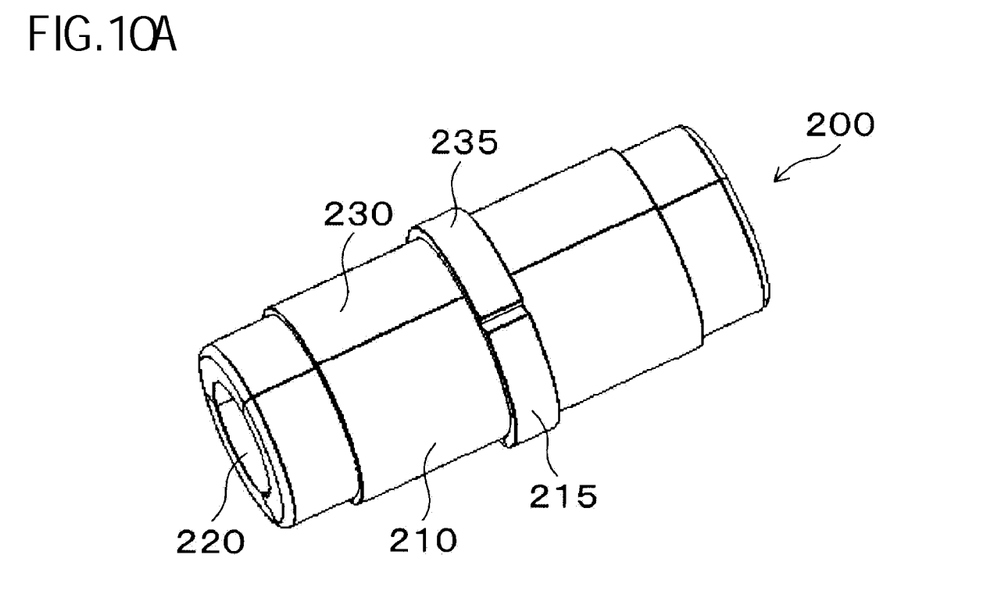
FIGS. 10A and 10B are perspective views of a retainer in FIGS. 9A and 9B.
Figure 10B:
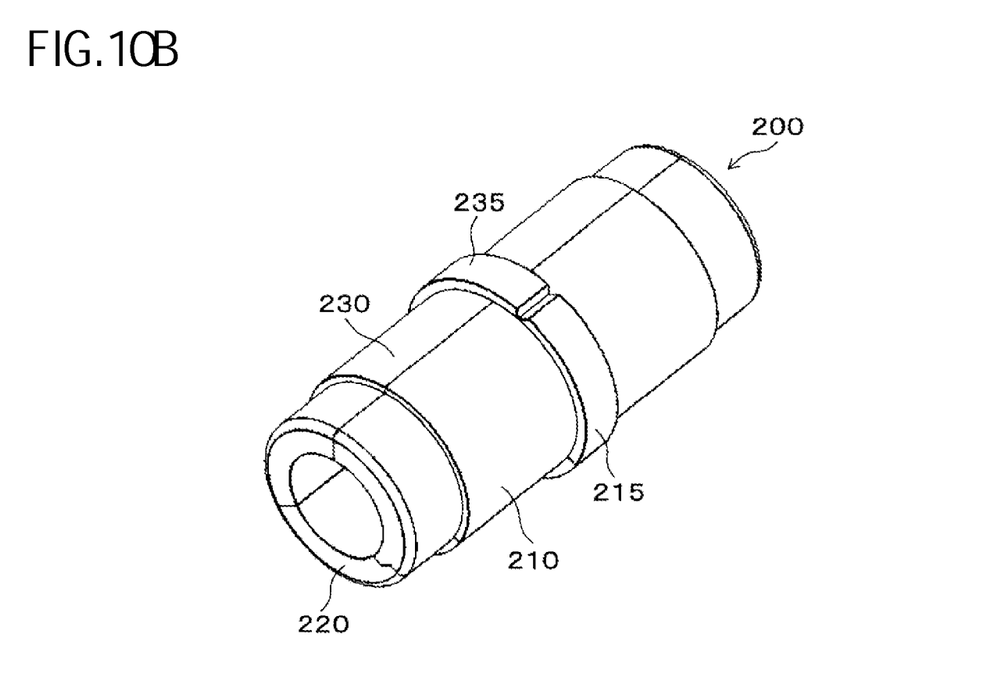
Figure 11A:
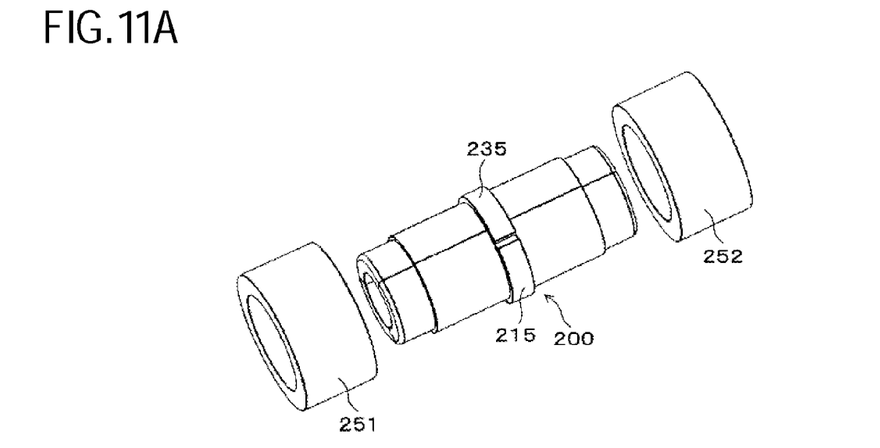
FIG. 11A is a perspective view illustrating a state where a rotor magnet is mounted on the retainer.
Figure 11B:
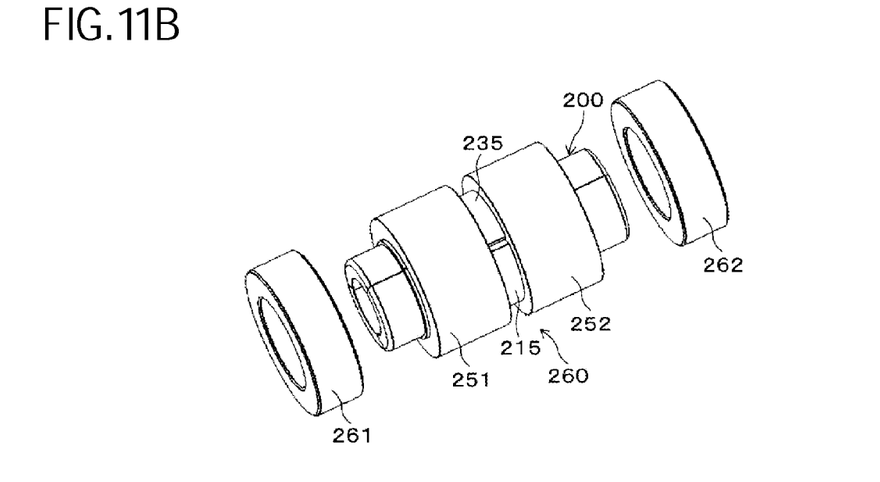
FIG. 11B is a perspective view illustrating a state where a bearing is being mounted.
Figure 11C:
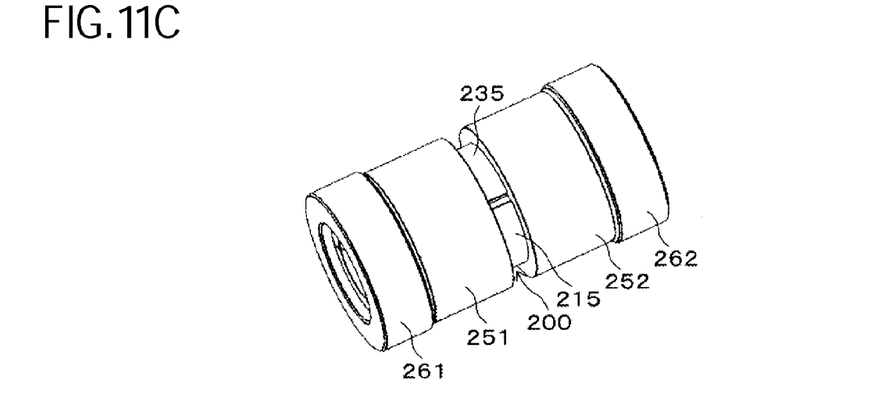
FIG. 11C is a perspective view illustrating a state where the bearing is mounted in the second embodiment.

FIGS. 10A and 10B show the state where the retainer segment pieces 210, 220 and 230 are assembled to form the retainer 200. FIG. 11A shows the state where rotor magnets 251 and 252 are mounted on the retainer 200. FIG. 11B shows the state where the rotor magnets 251 and 252 are mounted on the retainer 200 to form a rotor 260, and bearings (rolling bearings) 261 and 262 are further mounted on the outside of the retainer 200. FIG. 11C shows the state where the rotor magnets 251 and 252 are mounted on the retainer 200, and the bearings 261 and 262 are further mounted. The axial position of the rotor magnets 251 and 252 are determined by protrusion of the magnet stoppers 215, 225 and 235. In FIG. 11, the magnet stopper 225 illustrated in FIG. 9 is not shown, since it is in a blind area.

In this instance, the bearing 261 corresponds to the bearing 110 in FIG. 1, and the bearing 262 corresponds to the bearing 111 in FIG. 1. In the case of this example, there is no member corresponding to the sleeves 112 and 113 in FIG. 1, and the rotor magnets 251 and 252 and the bearings 261 and 262 are directly inserted onto the outside of the retainer 200. The bearing 251 is attached to the inside of the front housing 101 and the stator 103 in FIG. 1, and the bearing 252 is attached to the inside of the end housing 102 and the stator 104 in FIG. 1. In this instance, the rotor 260 is rotatable with respect to the stators 103 and 104. Other structures and the function of the retainer 200 are same as those of the linear actuator 100 illustrated in FIG. 1.

In the case where the structure in FIGS. 9 to 11 is employed, the number of components is reduced, and thus a cost can be reduced, as compared to the case of using the sleeve. In addition, by the amount of the sleeve, the thickness of the retainer can be thickened, thereby increasing the strength of the retainer. Since there is no orientation when the rotor magnets 251 and 252 are assembled using the magnet stoppers 215, 225 and 235, the assembly is easily carried out. Also, since it can be assembled as a basis of the concave/convex shape, it is possible to obtain the precision in pitch of the balls 250 retained therein.

(Others)

Although FIG. 5 or 9 shows that the retainer is segmented into plural pieces in the circumferential direction, the retainer may be segmented into plural pieces in the axial direction. As the segmented structure, for example, a structure where the retainer is segmented into two pieces in the axial direction can be employed. In the case where the retainer is segmented into two pieces in the axial direction, the segment pieces of the segmented retainer are formed in a symmetrical shape, thereby suppressing the increase in kinds of components. As a result, it is advantageous to a molding cost or an assembling cost.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A linear actuator comprising:
   an output shaft formed with a helical groove;
   a retainer having a cylindrical shape which receives the output shaft therein, and provided with a plurality of concave portions spaced from each other at positions of an inner peripheral surface thereof along the helical groove;
   a pair of sleeves having a cylindrical shape and mounted on a circumference of the retainer from a front side and a rear side in an axial direction;
   a rotor magnet fixed in surrounding relation to the retainer; and
   balls which are retained in the plurality of concave portions, respectively,
   wherein when the retainer is rotated, the balls are moved along the helical groove of the output shaft in a state where the balls are retained in the concave portions,
   wherein the pair of sleeves have edge portions opposing each other, and each of the edge portions is provided with a concavo-convex structure,
   wherein the retainer is divided into segments along lines extending substantially parallel to a longitudinal axis thereof such that it includes a first retainer segment, a second retainer segment, and a third retainer segment, and
   wherein the third retainer segment is provided with a protrusion inserted between and in contact with the concavo-convex structures of the sleeves so that the protrusion positions the concavo-convex structures of the pair of sleeves relative to each other and prevents rotation of the pair of sleeves.

2. The linear actuator according to claim 1, wherein the concavo-convex structures provided on the edge portions of the pair of sleeves are fixed to the retainer with an adhesive in a state where a concave portion of one of the sleeves opposes a concave portion of the other of the sleeves to define a gap therebetween, and a convex portion of one of the sleeves opposes a convex portion of the other of the sleeves, and wherein the adhesive is filled in the gap.

3. The linear actuator according to claim 1, wherein the first retainer segment and the second retainer segment have a same shape.

4. The linear actuator according to claim 1, wherein each concave portion is fully defined within one of the segments.

5. The linear actuator according to claim 1, wherein the concavo-convex structures provided on the edge portions of the pair of sleeves each include multiple concave portions and multiple convex portions such that more than one said gap is defined between opposing concave portions of the sleeves, the protrusion has a size and shape substantially the same as that of each of the gaps, and the protrusion is fitted within one of the gaps.

* * * * *